US008705483B2

(12) United States Patent
Liu

(10) Patent No.: US 8,705,483 B2
(45) Date of Patent: Apr. 22, 2014

(54) DOWNLINK BASEBAND SIGNAL GENERATING METHOD, RELEVANT DEVICE AND SYSTEM

(71) Applicant: Huawei Technologies Co., Ltd., Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/711,541

(22) Filed: Dec. 11, 2012

(65) Prior Publication Data
US 2013/0100907 A1    Apr. 25, 2013

Related U.S. Application Data

(63) Continuation of application No. PCT/CN2011/078894, filed on Aug. 25, 2011.

(30) Foreign Application Priority Data

Dec. 21, 2010   (CN) .......................... 2010 1 0598899

(51) Int. Cl.
   *H04W 72/04*   (2009.01)
(52) U.S. Cl.
   CPC .................................. *H04W 72/042* (2013.01)
   USPC ........................................ 370/329; 455/501
(58) Field of Classification Search
   USPC .......................................... 370/329; 455/501
   See application file for complete search history.

(56) References Cited

U.S. PATENT DOCUMENTS

| 8,155,233 | B1 * | 4/2012 | Lee et al. ...................... 375/267 |
| 2004/0003285 | A1 * | 1/2004 | Whelan et al. ................ 713/201 |
| 2009/0122899 | A1 | 5/2009 | Kolu et al. |
| 2009/0310696 | A1 * | 12/2009 | Yang ............................. 375/267 |
| 2010/0027456 | A1 * | 2/2010 | Onggosanusi et al. ....... 370/312 |

(Continued)

FOREIGN PATENT DOCUMENTS

| CN | 101136811 A | 3/2008 |
| CN | 101527936 A | 9/2009 |

(Continued)

OTHER PUBLICATIONS

"C-RAN: The Road Towards Green RAN," White Paper, Apr. 2010, Version 1.0.0, China Mobile Research Institute, Beijing, China.

(Continued)

*Primary Examiner* — Hassan Kizou
*Assistant Examiner* — Tejis Daya
(74) *Attorney, Agent, or Firm* — Leydig, Voit & Mayer, Ltd.

(57) ABSTRACT

The downlink baseband signal generating method includes: performing channel coding and modulation on a downlink data stream of a user in a cell, and obtaining a downlink coded and modulated user signal of the cell; generating a downlink control channel signal according to physical-layer control information; and forwarding the reference signal, synchronization signal, broadcast channel signal, downlink coded and modulated user signal, and downlink control channel signal to the corresponding RRU, so that the corresponding RRU performs MIMO precoding on the downlink coded and modulated user signal, maps the MIMO-precoded signal, the downlink control channel signal, reference signal, synchronization signal, and broadcast channel signal to their respective subcarriers, performs IFFT transformation to obtain a downlink baseband signal, and sends the signal out. The embodiments of the present invention can reduce the signal transmission bandwidth between the C-RAN node and the RRU.

13 Claims, 11 Drawing Sheets

(56) References Cited

U.S. PATENT DOCUMENTS

| | | | |
|---|---|---|---|
| 2010/0074128 A1* | 3/2010 | Ishii | 370/252 |
| 2010/0278132 A1* | 11/2010 | Palanki et al. | 370/329 |
| 2010/0296469 A1 | 11/2010 | Zhou et al. | |
| 2010/0303174 A1* | 12/2010 | Oh et al. | 375/329 |
| 2012/0002741 A1* | 1/2012 | Wang et al. | 375/260 |
| 2012/0189077 A1* | 7/2012 | Seo et al. | 375/267 |

FOREIGN PATENT DOCUMENTS

| | | |
|---|---|---|
| CN | 101557597 A | 10/2009 |
| CN | 101695192 A | 4/2010 |
| CN | 101730307 A | 6/2010 |
| CN | 101753181 A | 6/2010 |
| CN | 101868054 A | 10/2010 |
| EP | 1713290 A1 | 10/2006 |
| EP | 2117146 A1 | 2/2008 |
| WO | 2009151355 A1 | 12/2009 |

OTHER PUBLICATIONS

Wang et al, "C-RAN: Evolution Toward Green Radio Access Network," Jan. 2010, China Mobile Research Institute, Beijing, China.

International Search Report in corresponding International Patent Application No. PCT/CN2011/078894 (Dec. 1, 2011).

Extended European Search Report in corresponding European Patent Application No. 11851653.3 (Feb. 8, 2013).

Written Opinion of the International Searching Authority in corresponding PCT Patent Application No. PCT/CN2011/078894 (Dec. 1, 2011).

"C-RAN: The Road Towards Green RAN," White Paper, Oct. 2011, XP-002700746, Version 2.5, China Mobile Research Institute, Beijing, China.

Wang et al., "Application of BBU+RRU based CoMP system to LTE-Advanced," 2009, IEEE, New York, New York.

Hu Jinling, "TD-SCDMA/TD-LTE Evolution—Go Green," 2010, IEEE, New York, New York.

"3GPP TSG-RAN1 #55—$3^{rd}$ Generation Partnership Project; Application of BBU+RRU based CoMP system to LTE-Advanced," R1-084487, Nov. 2008, $3^{rd}$ Generation Partnership Project, Valbonne, France.

* cited by examiner

DOWNLINK BASEBAND SIGNAL GENERATING METHOD, RELEVANT DEVICE AND SYSTEM

CROSS-REFERENCE TO RELATED APPLICATIONS

This application is a continuation of International Patent Application No. PCT/CN2011/078894, filed on Aug. 25, 2011, which claims priority to Chinese Patent Application No. 201010598899.3, filed on Dec. 21, 2010, both of which are hereby incorporated by reference in their entireties.

FIELD OF THE INVENTION

The present invention relates to the field of communications technologies, and in particular, to a downlink baseband signal generating method and a relevant device and system.

BACKGROUND OF THE INVENTION

In a distributed base station with remote radio, the base station is divided into two mutually independent parts: baseband unit (Base-band Unit, BBU), and remote radio unit (Remote radio unit, RRU). The RRU is placed at the access point far away from the BBU. They are connected through fibers to transmit a baseband signal in an analog or digital mode. A distributed antenna system (Distributed Antenna System, DAS) is similar to a distributed base station with remote radio. However, the distance between the BBU and the RRU is extensible to thousands of kilometers or even tens of thousands of kilometers. Moreover, the BBU may be connected to the RRU through a fiber directly or through an optical transport network such as passive optical network (Passive Optical Network, PON) or wavelength division multiplexing (Wavelength Division Multiplexing, WDM). Further, interference between cells is reduced and the system capacity is improved through a multi-cell joint processing mode such as network multiple-input multiple-output (Multiple-Input Multiple-Output, MIMO) system or multi-cell joint scheduling.

Currently, a Cloud Radio Access Network (C-RAN) system based on a cloud computing technology is attracting attention of the industry. The C-RAN is a larger radio access system formed through a cloud computing technology on the basis of the DAS technology. Compared with the DAS, the C-RAN connects the BBUs of multiple base stations through fibers or an optical transport network, and uses the cloud computing technology to virtualize the processing resources of all BBUs into a uniform resource pool. In this way, the system can implement statistical multiplexing of signal processing resources, which reduces the system cost significantly. In addition, like the DAS, the C-RAN can enhance the system capacity by means such as multi-cell joint processing.

As shown in FIG. 1, FIG. 1 is a schematic diagram of C-RAN system architecture in the prior art. The C-RAN system includes multiple C-RAN nodes. The multiple C-RAN nodes are interconnected through high-capacity fibers or optical transport networks. Each C-RAN node is connected with the RRU in a small-cell cluster (Small-Cell Cluster) in a star or ring mode through a fiber directly or through an optical transport network. Each C-RAN node is primarily responsible for radio access of users (RS) in its own small-cell cluster, including physical-layer signal processing, media access control (Media Access Control, MAC), and radio resource management (Radio Resource Management, RRM). When the processing load of a C-RAN node is light, namely, when the user traffic volume in its own small-cell cluster is not great, the C-RAN node can assist in handling radio access for a part of users in a small-cell cluster of other C-RAN nodes. When the user traffic volume in a small-cell cluster of a C-RAN node is too great so that the corresponding C-RAN node can hardly handle radio access of all users in its small-cell cluster efficiently in time, the baseband radio signals of a part of cells may be routed, through a high-capacity fiber or optical transport network connected to all C-RAN nodes, onto the light-loaded C-RAN node with low user traffic volume in the small-cell cluster.

Referring to FIG. 2, FIG. 2 is a schematic structural diagram of a C-RAN node in the prior art. FIG. 2 shows only main functional modules of a C-RAN node. A practical C-RAN node further includes other functional modules such as timing unit, control unit, and interface unit. As shown in FIG. 2, a C-RAN node may include multiple BBUs. Each BBU is responsible for handling physical-layer signals of some users, possibly including MAC/RRM processing. The C-RAN node further includes a forwarding unit. The forwarding unit is connected with all RRUs, and is also connected with other C-RAN nodes, and is configured to forward the baseband signal of the RRU connected to the C-RAN, and the baseband signal from other C-RAN nodes, onto each BBU for processing. The RRU is primarily responsible for implementing functions of a transceiver (TRX) module. That is, in the downlink direction, the RRU converts a downlink baseband signal into a radio frequency signal, amplifies the power of the signal, and then transmits the signal through an antenna; in the uplink direction, the RRU receives the uplink radio frequency signal from the antenna, amplifies the signal, and converts the signal into a baseband signal.

In the practice, the inventor finds that: With emergence of the third generation (3G) and fourth generation (4G) mobile communication technologies such as long term evolution (Long Term Evolution, LTE), the radio spectrum is wider and wider (20 MHz-100 MHz). Meanwhile, the multi-antenna technologies such as MIMO are applied massively, which makes the transmission bandwidth wider and wider between the C-RAN node and the RRU. Therefore, it is very important to reduce the required signal transmission bandwidth between the C-RAN node and the RRU.

SUMMARY OF THE INVENTION

An embodiment of the present invention provides a downlink baseband signal generating method and a relevant device and system to reduce signal transmission bandwidth between a C-RAN node and an RRU.

An embodiment of the present invention provides a downlink baseband signal generating method, including:

performing channel coding and modulation on a downlink data stream of a user in a cell, and obtaining a downlink coded and modulated user signal of the cell;

generating a downlink control channel signal according to physical-layer control information; and forwarding a reference signal, a synchronization signal, a broadcast channel signal, the downlink coded and modulated user signal, and the downlink control channel signal to a corresponding remote radio unit, so that the remote radio unit performs multi-input multi-output precoding on the downlink coded and modulated user signal, maps the signal that has undergone the multi-input multi-output precoding, the downlink control channel signal, the reference signal, the synchronization signal, and the broadcast channel signal to their respective subcarriers, performs inverse fast Fourier transformation to obtain a downlink baseband signal, and sends the signal out.

An embodiment of the present invention provides another downlink baseband signal generating method, including:

receiving a downlink coded and modulated user signal and a downlink control channel signal of a specific cell, where the signals are forwarded by a radio access network node, the downlink coded and modulated user signal is obtained after the radio access network node performs channel coding and modulation on a downlink data stream of a user in the specific cell, and the downlink control channel signal is generated by the radio access network node according to physical-layer control information;

performing multi-input multi-output precoding on the downlink coded and modulated user signal;

receiving a reference signal, a synchronization signal, and a broadcast channel signal that are forwarded by the radio access network node; and mapping the signal that has undergone the multi-input multi-output precoding, the downlink control channel signal, the reference signal, the synchronization signal, and the broadcast channel signal to their respective subcarriers, performing inverse fast Fourier transformation to obtain a downlink baseband signal, and sending the signal out.

Accordingly, an embodiment of the present invention provides a radio access network node, including:

at least one baseband unit and a forwarding unit.

The baseband unit includes:

a data channel coding and modulating module, configured to perform channel coding and modulation on a downlink data stream of a user in a cell, obtain a downlink coded and modulated user signal of the cell, and output the signal to the forwarding unit; and a downlink control channel generating module, configured to generate a downlink control channel signal according to physical-layer control information, and output the signal to the forwarding unit.

The forwarding unit is configured to forward a reference signal, a synchronization signal, a broadcast channel signal, the downlink coded and modulated user signal, and the downlink control channel signal to a corresponding remote radio unit, so that the remote radio unit performs multi-input multi-output precoding on the downlink coded and modulated user signal, maps the signal that has undergone the multi-input multi-output precoding, the downlink control channel signal, the reference signal, the synchronization signal, and the broadcast channel signal to their respective subcarriers, performs inverse fast Fourier transformation to obtain a downlink baseband signal, and sends the signal out.

Accordingly, an embodiment of the present invention provides a remote radio unit, including:

a precoding module, configured to receive a downlink coded and modulated user signal and a downlink control channel signal of a specific cell, where the signals are forwarded by a radio access network node; and perform multi-input multi-output precoding on the downlink coded and modulated user signal, where the downlink coded and modulated user signal is obtained after the radio access network node performs channel coding and modulation on a downlink data stream of a user in the specific cell, and the downlink control channel signal is generated by the radio access network node according to physical-layer control information;

a resource mapping module, configured to receive a reference signal, a synchronization signal, and a broadcast channel signal of a specific cell, where the signals are forwarded by the radio access network node; and map the signal that has undergone the multi-input multi-output precoding, the downlink control channel signal, the reference signal, the synchronization signal, and the broadcast channel signal to their respective subcarriers;

a transforming module, configured to perform inverse fast Fourier transformation on the signals mapped onto the subcarriers to obtain downlink a baseband signal; and a transceiver module, configured to send the downlink baseband signal out.

Accordingly, an embodiment of the present invention provides a downlink baseband signal generating system, which includes the foregoing radio access network node and the foregoing remote radio unit. The foregoing radio access network node is connected with the foregoing remote radio unit through a fiber or optical transport network.

In the embodiments of the present invention, after receiving the downlink data stream sent by a user in the cell, the C-RAN node performs channel coding and modulation on the downlink data stream of the user in the cell to obtain a downlink coded and modulated user signal of the cell, and forwards the reference signal, synchronization signal, broadcast channel signal, downlink coded and modulated user signal, and the downlink control channel signal to the corresponding RRU; afterward, the corresponding RRU performs MIMO precoding on the downlink coded and modulated user signal, maps the reference signal, synchronization signal, broadcast channel signal, the signal that has undergone the MIMO precoding, and the downlink control channel signal to their respective subcarriers, performs IFFT transformation to obtain a downlink baseband signal, and sends the signal out. In this embodiment, the MIMO precoding, signal mapping and IFFT transformation are moved ahead to the RRU, and therefore, the signals on the corresponding subcarriers do not need to be transmitted between the C-RAN node and the RRU, which reduces the signal transmission bandwidth between the C-RAN node and the RRU.

BRIEF DESCRIPTION OF THE DRAWINGS

To make the technical solution of the present invention or the prior art clearer, the following describes the accompanying drawings that illustrate the embodiments of the present invention or the prior art. Evidently, the accompanying drawings are illustrative rather than exhaustive, and those skilled in the art can derive other drawings from such accompanying drawings without making any creative effort.

DETAILED DESCRIPTION OF THE EMBODIMENTS

The following detailed description is provided in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments provided herein without any creative effort, shall fall within the protection scope of the present invention.

An embodiment of the present invention provides a downlink baseband signal generating method and a relevant device and system. The method is applicable to a system based on Orthogonal Frequency Division Multiple Access (Orthogonal Frequency Division Multiple Access, OFDMA) or the same type of technology such as Single Carrier Frequency Division Multiple Access (Single Carrier Frequency Division Multiple Access, SC-FDMA), for example, LTE system, LTE-Advanced (LTE-Advanced, LTE-A) system, or Worldwide Interoperability for Microwave Access (Worldwide Interoperability for Microwave Access, WiMAX) system to reduce the signal transmission bandwidth between the C-RAN node and the RRU.

Figure 1:
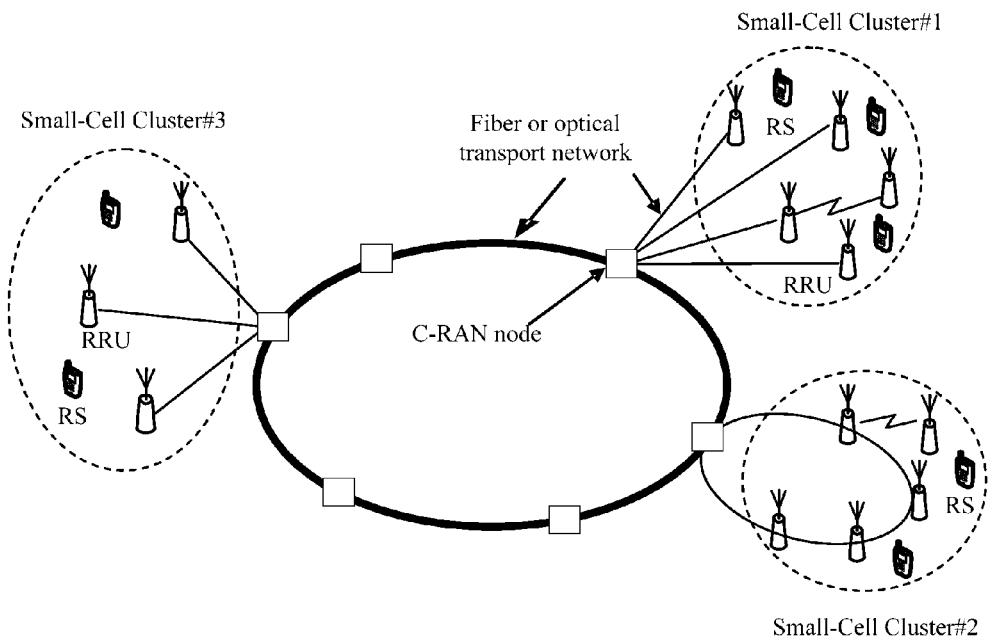
FIG. 1 is a schematic diagram of C-RAN system architecture in the prior art.
Figure 2:
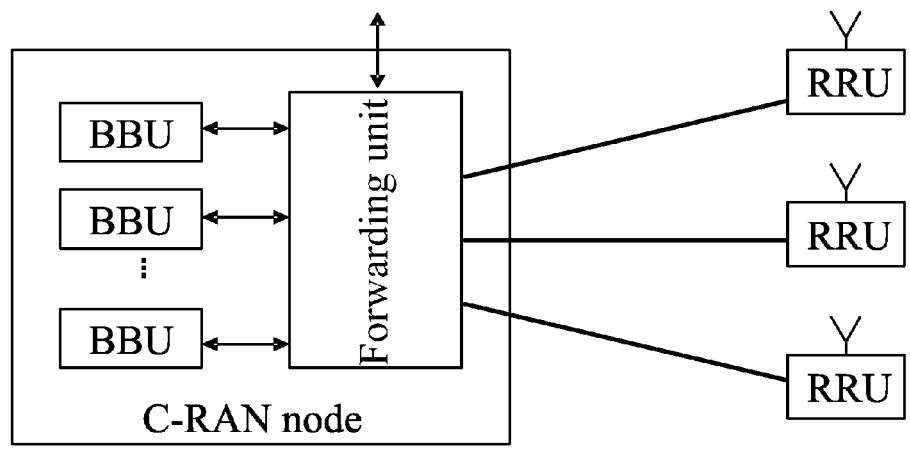
FIG. 2 is a schematic structural diagram of a C-RAN node in the prior art.
Figure 3:
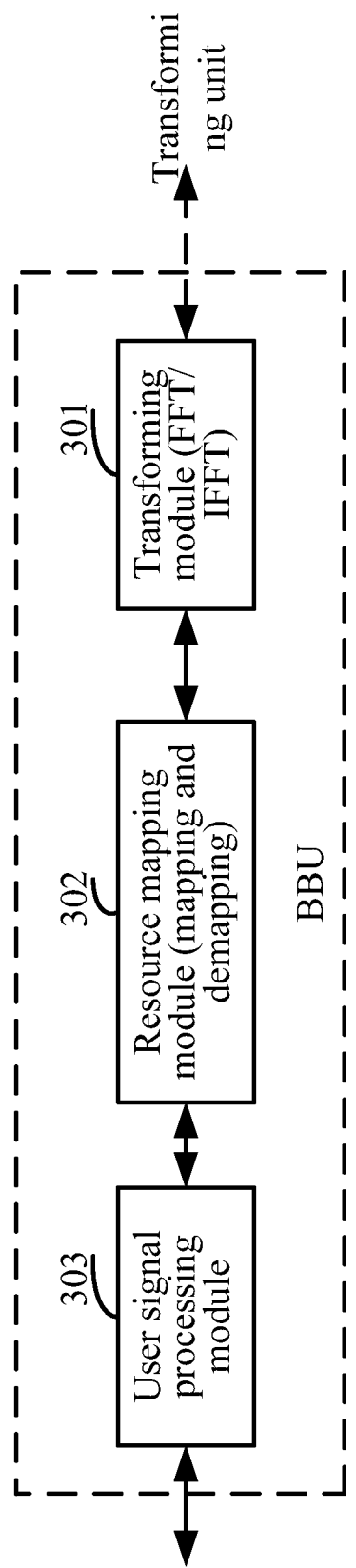
FIG. 3 is a schematic structural diagram of a BBU in the prior art.

In the foregoing systems such as LTE, LTE-A, and WiMAX, a BBU may be divided into a transforming module 301 capable of fast Fourier transformation (Fast Fourier Transform, FFT) and inverse fast Fourier transformation (Inverse Fast Fourier Transformation, IFFT), a resource mapping module 302 capable of mapping and demapping, and a user signal processing module 303, as shown in FIG. 3. It should be noted that the modules shown in FIG. 3 are user-plane functional modules of the BBU. In practical application, the BBU may further include physical-layer process control modules responsible for control channel processing, power control, Hybrid Automatic Repeat reQuest (HARQ)/Adaptive Modulation and Coding (AMC), and random access. Further, the BBU may include upper-layer protocol processing function modules such as MAC/RRM.

Figure 4:
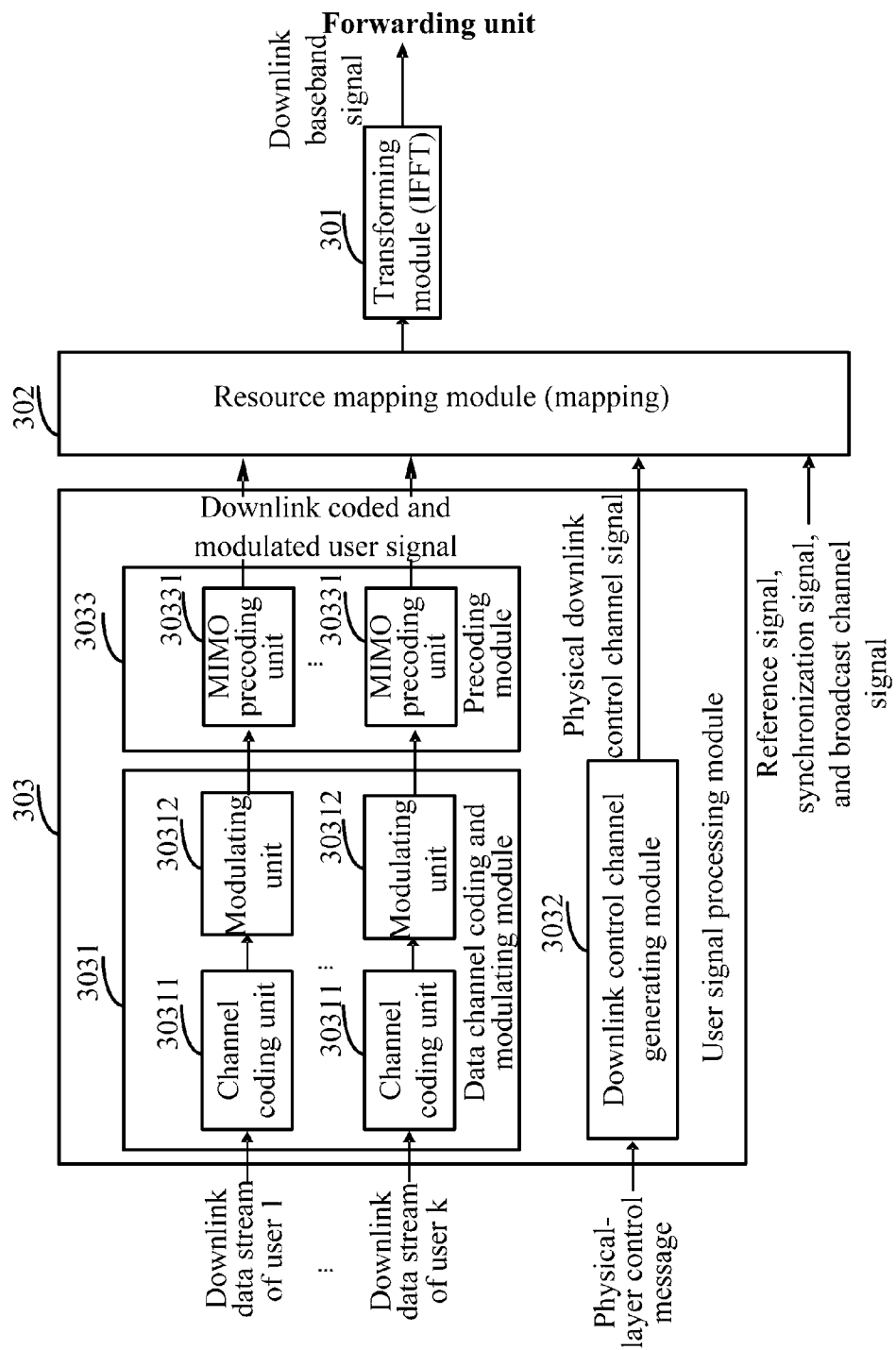
FIG. 4 is a more detailed schematic structural diagram of a BBU shown in FIG. 3.

For ease of understanding the technical solution of the present invention and benefits of the embodiments of the present invention, the following describes the downlink baseband signal generating method in the prior art first on the basis of the BBU shown in FIG. 3. As shown in FIG. 4, FIG. 4 is a more detailed schematic structural diagram of a BBU shown in FIG. 3. The user signal processing module 303 may be divided into a data channel coding and modulating module 3031 (including a channel coding unit 30311 and a modulating unit 30312), a downlink control channel generating module 3032, and a precoding module 3033 (including a MIMO precoding unit 30331). In the downlink direction, signals are processed periodically at a specific Transmission Time Interval (TTI). In an LTE system, the TTI is a sub-frame, which includes 14 OFDM symbols and corresponds to time of 1 ms.

As shown in FIG. 4, in a TTI, the downlink data streams of user 1-user k pass through the channel coding unit 30311, modulating unit 30312, and MIMO precoding unit 30331 respectively, and then generate a downlink coded and modulated user signal respectively. The downlink coded and modulated user signals are mapped to the corresponding subcarriers by the resource mapping module 302 respectively. Meanwhile, the physical-layer control messages generated in the BBU pass through the downlink control channel generating module 3032 to generate downlink control channel signals. The downlink control channel signals are also mapped onto the corresponding subcarriers by the resource mapping module 302 respectively. In practical application, the downlink control channel generating module 3032 may further include a channel coding unit, a modulating unit, a MIMO precoding unit, and so on. In addition, the resource mapping module 302 maps the reference signal, synchronization signal, and broadcast channel signal, which are generated inside the BBU, onto specific subcarriers in the locations of certain fixed OFDM symbols.

In this way, all signals are mapped by the resource mapping module 302 to generate downlink frequency domain signals. The downlink frequency domain signals undergo the IFFT transformation performed by the transforming module 301 to generate a time-domain downlink baseband signal. The downlink baseband signal may be forwarded to the corresponding RRU by a forwarding unit in the C-RAN node. The corresponding RRU is responsible for converting a downlink baseband signal into a radio frequency signal, amplifying the signal, and then transmitting the signal through an antenna. In the foregoing method, the signals on the corresponding subcarriers need to be transmitted between the BBU and the RRU, which requires high signal transmission bandwidth between the C-RAN node that includes multiple BBUs and the RRU.

Figure 5:
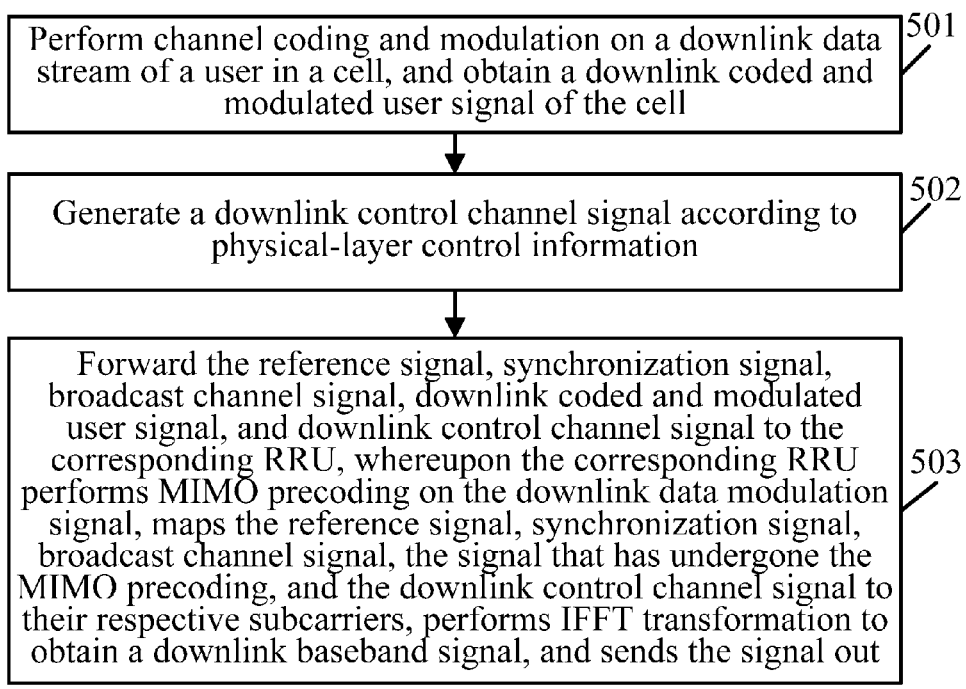
FIG. 5 is a flowchart of a downlink baseband signal generating method according to an embodiment of the present invention.

An embodiment of the present invention provides a downlink baseband signal generating method to overcome the technical drawbacks existing in the foregoing method. FIG. 5 is a schematic flowchart of a downlink baseband signal generating method according to an embodiment of the present invention. As shown in FIG. 5, the method may include the following steps:

501. Perform channel coding and modulation on a downlink data stream of a user in a cell, and obtain a downlink coded and modulated user signal of the cell.

In this embodiment, a C-RAN node includes multiple BBUs. Each BBU serves one cell. Through the BBU in the C-RAN node, the C-RAN node can receive a downlink data stream sent by a user in the cell served by the BBU; or, through the BBU in the C-RAN node, the C-RAN node can receive a downlink data stream that is sent by a user in another cell and is forwarded by another C-RAN node, and perform channel coding and modulation on the downlink data stream to obtain a downlink coded and modulated user signal in a corresponding cell.

For example, after performing channel coding on a downlink data stream of a user in a cell, the C-RAN node may modulate the downlink data stream of the user to obtain a downlink coded and modulated user signal, where the modulation may be performed in any one of the following modes: Quadrature Phase Shift Keying (Quadrature Phase Shift Keying, QPSK), 16 Quadrature Amplitude Modulation (16 Quadrature Amplitude Modulation, 16QAM), and 64 Quadrature Amplitude Modulation (64 Quadrature Amplitude Modulation, 64QAM).

502. Generate a downlink control channel signal according to physical-layer control information.

In this embodiment, the BBU included in the C-RAN node may generate physical-layer control information in each transmission time interval (TTI). Further, the BBU may generate a downlink control channel signal from the physical-layer control information through a downlink control channel generating module.

The downlink control channel signal is used to control the bandwidth and signal-to-noise ratio of a downlink channel.

503. Forward a reference signal, a synchronization signal, a broadcast channel signal, the downlink coded and modulated user signal, and the downlink control channel signal to a corresponding RRU, so that the corresponding RRU performs MIMO precoding on the downlink data modulation signal, maps the reference signal, synchronization signal, broadcast channel signal, the signal that has undergone the MIMO precoding, and the downlink control channel signal to their respective subcarriers, performs IFFT transformation to obtain a downlink baseband signal, and sends the signal out.

The reference signal above provides reference information such as signal amplitudes and frequencies for various signals; the synchronization signal above provides synchronization timeslots to synchronize various signals; and the broadcast channel signal provides all types of broadcast channel information, which are well-known to those skilled in the art and are not described herein.

In an embodiment, the C-RAN node may forward the reference signal, synchronization signal, broadcast channel signal, downlink coded and modulated user signal, and downlink control channel signal to the corresponding RRU according to a preset forwarding configuration list, where the forwarding configuration list is used to record the mapping relationship between user information and corresponding RRU information. For example, the user information may be a parameter indicating a user identity, such as international mobile equipment identity (International Mobile Equipment Identity, IMEI); and the RRU information may be an RRU identifier.

In this embodiment, the MIMO precoding, signal mapping, and IFFT transformation are moved ahead of the forwarding unit for processing. For example, in an embodiment, such operations are moved ahead to the RRU for processing, and therefore, the signals on the corresponding subcarriers do not need to be transmitted between the C-RAN node and the RRU, which reduces the signal transmission bandwidth between the C-RAN node and the RRU.

Figure 6:
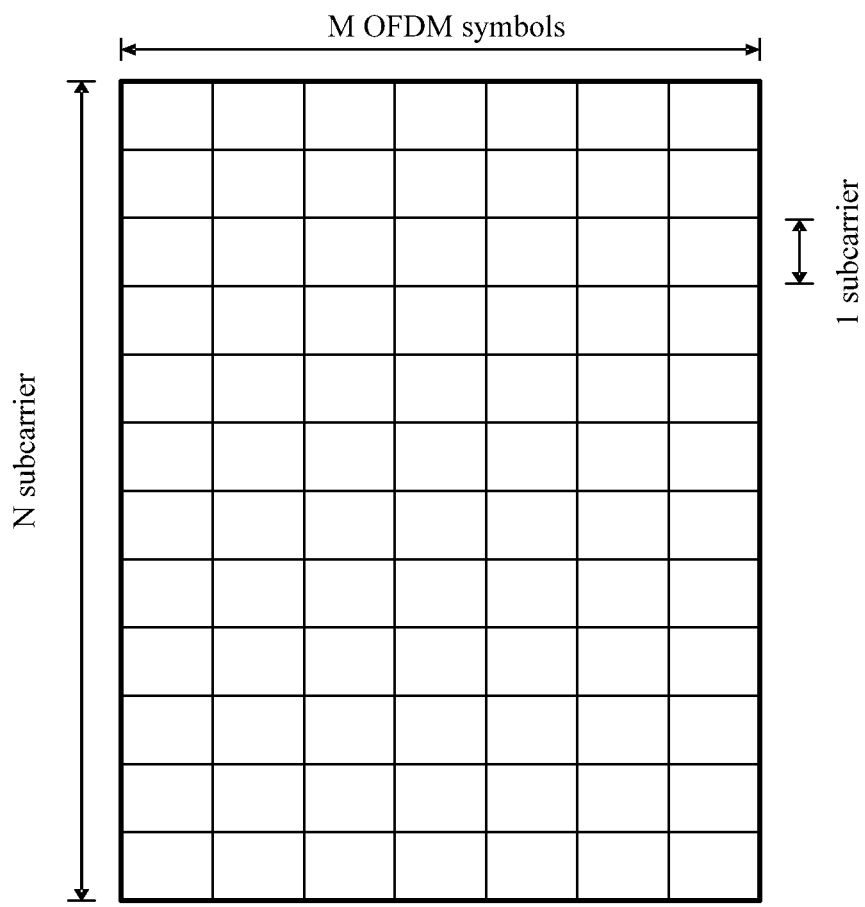
FIG. 6 is a schematic diagram of a physical resource block (PRB) according to an embodiment of the present invention.

In addition, in a system based on an OFDMA technology, the air interface resources between the C-RAN node and the RRU are generally allocated in the form of resource blocks. FIG. 6 is a schematic diagram of a physical resource block (Physical Resource Block, PRB). The PRB includes M continuous OFDM symbols on the time domain, and N continuous subcarriers on the frequency domain. Taking an LTE/LTE-A system as an example, generally, M=7, and N=12. For transmission of data streams of a user, the time and frequency resources allocated to each user are generally a logical virtual resource block (Virtual Resource Block, VRB). According to a preset algorithm, the system maps the VRB allocated to the user to a PRB in specific time and a specific frequency range. For example, in an LTE/LTE-A system, the size of the VRB is the same as the size of the PRB, that is, and the VRB and the PRB each includes 7 OFDM symbols and 12 subcarriers, and the VRB may be mapped to a PRB in a sub-frame. When allocating resources to a user, the system specifies information such as the type, sequence number, and size of a corresponding VRB resource, namely, VRB indication information. In this way, according to the preset algorithm, the subcarrier actually occupied by the user at the time of each OFDM symbol can be mapped. Therefore, the mapping and the demapping of the resource are multiplexing and demultiplexing operations of the user. Specifically, the mapping of the resource is to allocate the signals of each user to a corresponding subcarrier; and the demapping of the resource is to separate the signals of each user from the corresponding subcarrier.

The VRB generally is classified into two modes: localized (Localized) and distributed (Distributed). A localized VRB corresponds to continuous subcarriers, and is conducive to implementation of selective scheduling of a frequency and the MIMO precoding. A distributed VRB distributes subcarriers of a user into the entire system bandwidth, and can obtain frequency diversity gain. The distributed VRB is generally applicable to services of a small data volume, for example, a Voice over Internet Protocol (Voice over Internet Protocol, VoIP) service. The VRB is not only a minimum allocation unit of the resources occupied by the user, but also a minimum physical-layer radio transmission parameter configuration unit. That is, no matter whether the VRB is a localized VRB or a distributed VRB, the subcarriers of a certain data stream of a user in a VRB always have the same mode of coding and modulation and the same transmitting power, and the user transmission has the same MIMO mode and MIMO precoding matrix in a VRB.

The preceding describes a downlink baseband signal generating method provided in an embodiment of the present invention. By using this method, the signal transmission bandwidth between the C-RAN node and the RRU is reduced. The following provides more details about the downlink baseband signal generating method disclosed herein with reference to embodiments.

Embodiment 1

In this embodiment, in the downlink direction (from a C-RAN node to an RRU), a precoding unit (primarily used for MIMO precoding), a resource mapping module (primarily used for mapping and demapping), and a transforming module (primarily used for FFT/IFFT transformation) of each BBU included in the C-RAN node are moved ahead into a corresponding RRU before the forwarding unit, and each BBU reserves only the data channel coding and modulating module and the downlink control channel generating module. In this way, in the downlink direction, signals that need to be transmitted between the C-RAN node and the RRU include:

1. Downlink data modulation signal (namely, modulation symbol sequence) of each data stream of an active user in the current TTI, in which one user may transmit multiple data streams through multiple antennas simultaneously and an active user is a user who has data streams to be transmitted.

2. Precoding codebook index corresponding to each VRB in the current TTI, and transmit signal amplitude (or transmit power).

3. Information on a VRB resource allocated to each active user in the current TTI, namely, VRB indication information (type, sequence number, and size of the VRB resource).

4. Downlink control channel signal in the current TTI, and its transmission resource indication information.

In this embodiment, the transmission resource indication information may be carried in the downlink control channel signal sent by the C-RAN node. Through the transmission resource indication information, the RRU can map an MIMO-precoded signal and the downlink control channel signal onto their respective subcarriers. The transmission resource indication information is used to indicate the subcarriers that correspond to the MIMO-precoded signal and the downlink control channel signal respectively.

However, in this embodiment, the C-RAN node may construct a new transmission message that carries the transmission resource indication information and send the message to the RRU, and therefore, according to the transmission resource indication information carried in the new transmission message, the RRU can map the MIMO-precoded signal and the downlink control channel signal onto their respective subcarriers, which is not restricted herein.

5. Signal amplitude (or transmitting power) of the reference signal, synchronization signal, and broadcast channel signal in the current TTI.

6. Broadcast channel information in the current TTI.

In this embodiment, after the BBU generates a downlink coded and modulated user signal, the forwarding unit forwards the signal to the precoding module in the corresponding RRU directly, the precoding module performs MIMO precoding on the signal, and the resource mapping module in the corresponding RRU maps the MIMO-precoded signal and the downlink control channel information onto a corresponding subcarrier. Meanwhile, the forwarding unit forwards the reference signal, synchronization signal, and broadcast channel signal which are generated inside the BBU to the resource mapping module in the corresponding RRU. The locations of the reference signal, synchronization signal, and broadcast channel signal are fixed, and therefore, the resource mapping module can map the reference signal, synchronization signal, and broadcast channel signal to a corresponding subcarrier. Afterward, the transmitting module in the corresponding RRU performs IFFT transformation on the signals on all subcarriers to obtain a downlink baseband signal, and a transceiver (TRX) module sends the signal out.

The reference signal occupies about 5-15% of the system resources (depending on the number of transmitting antennas and a motion rate). The location of the reference signal in time frequency resources is fixed, and a modulation mode is fixed (generally QPSK), and therefore, the reference signal sequence in use is predetermined. The broadcast channel information and the synchronization signal have similar characteristics. Therefore, through the method provided in this embodiment, the signals on the corresponding subcarriers such as the reference signal, broadcast channel signal and synchronization signal do not need to be transmitted between the C-RAN node and the RRU, which further compresses the transmission rate and reduces the signal transmission bandwidth.

For the data channel for transmitting a user data stream, the streams transmitted between the C-RAN node and the RRU in this embodiment are not MIMO-precoded signal streams, but user data streams that are not MIMO-precoded, which accomplishes the objectives of compressing the transmission rate and reducing the signal transmission bandwidth. In this embodiment, the function of MIMO precoding may be expressed as:

$$x = \begin{bmatrix} x_1 \\ x_2 \\ \vdots \\ x_M \end{bmatrix} = W_{M \times K} \begin{bmatrix} s_1 \\ s_2 \\ \vdots \\ s_K \end{bmatrix} = Ws \quad (1)$$

wherein, x indicates a MIMO-precoded signal vector; W is an M×K precoding matrix; M is the number of transmitting antennas; K is the number of data streams transmitted by the user simultaneously, and K≤M; S is a data stream vector of a cell.

The system generally defines a precoding matrix codebook (pre-designed precoding matrix set), and a precoding matrix index indicates the precoding matrix in use.

As described above, the subcarriers of a data stream of a user in a VRB always have the same mode of coding and modulation and the same transmitting power, and the user transmission has the same MIMO mode and MIMO precoding matrix in a VRB. Therefore, if the transmitted streams are K data streams $s_1, s_2, \ldots, s_K$ of active users, which are not MIMO-precoded, rather than the MIMO-precoded signal streams $x_1, x_2, \ldots, x_M$, when K<M, the transmission rate is reduced, and the required signal transmission bandwidth is reduced; meanwhile, because the subcarriers of a data stream of a user in a VRB always have the same mode of coding and modulation and the same transmitting power, the transmission rate can be further compressed.

Taking a frequency division duplexing (Frequency Division Duplexing, FDD) LTE system as an example, after undergoing the channel coding and modulation, a data stream of a user includes an I/Q phase, and a VRB includes 12 subcarriers. The signals carried by them have the same modulation mode, namely, QPSK or 16QAM or 64QAM. The three modulation modes correspond to 1-bit, 2-bit, and 3-bit in-phase or quadrature-phase respectively. For example, each sample point (corresponding to a subcarrier) generally employs 16-bit transmission, 12 subcarriers require 16×12=192 bits. Because the 12 subcarriers have the same modulation mode such as 16QAM, each of the 12 subcarriers carries only 2 bits of modulation information, uses 8 bits to carry a power offset, and uses 8 bits to carry a precoding matrix index. Therefore, each VRB carries only 2×12+8+8=40 bits. In this way, the compression rate of the signal transmission bandwidth reaches about 80%. Similarly, if the modulation mode is 64QAM or QPSK, the compression rate of the signal transmission bandwidth is about 70% or 85% respectively. In a practical system, the 64QAM modulation mode is seldom applied. Therefore, the average compression rate of the signal transmission bandwidth is about 80%.

As analyzed above, the information that needs to be transmitted between the C-RAN node and the RRU is forwarded to the RRU. For the data channel, the data stream of each user is processed by the MIMO precoding unit in the RRU, and the resource mapping module maps the processed data stream and the downlink control channel signal from the C-RAN node onto the corresponding subcarrier according to the transmission resource indication information carried in the downlink control channel signal sent by the C-RAN node. The reference signal, the synchronization signal, and the broadcast channel signal are also mapped onto the corresponding subcarrier according to the preset rule in the system, and then undergo IFFT transformation performed by the transforming module to generate a time-domain downlink baseband signal. Finally, the transceiver (TRX) module performs digital-to-analog conversion, up conversion, and amplification on the signals to generate radio frequency signals, which are then transmitted by antennas.

Figure 7:
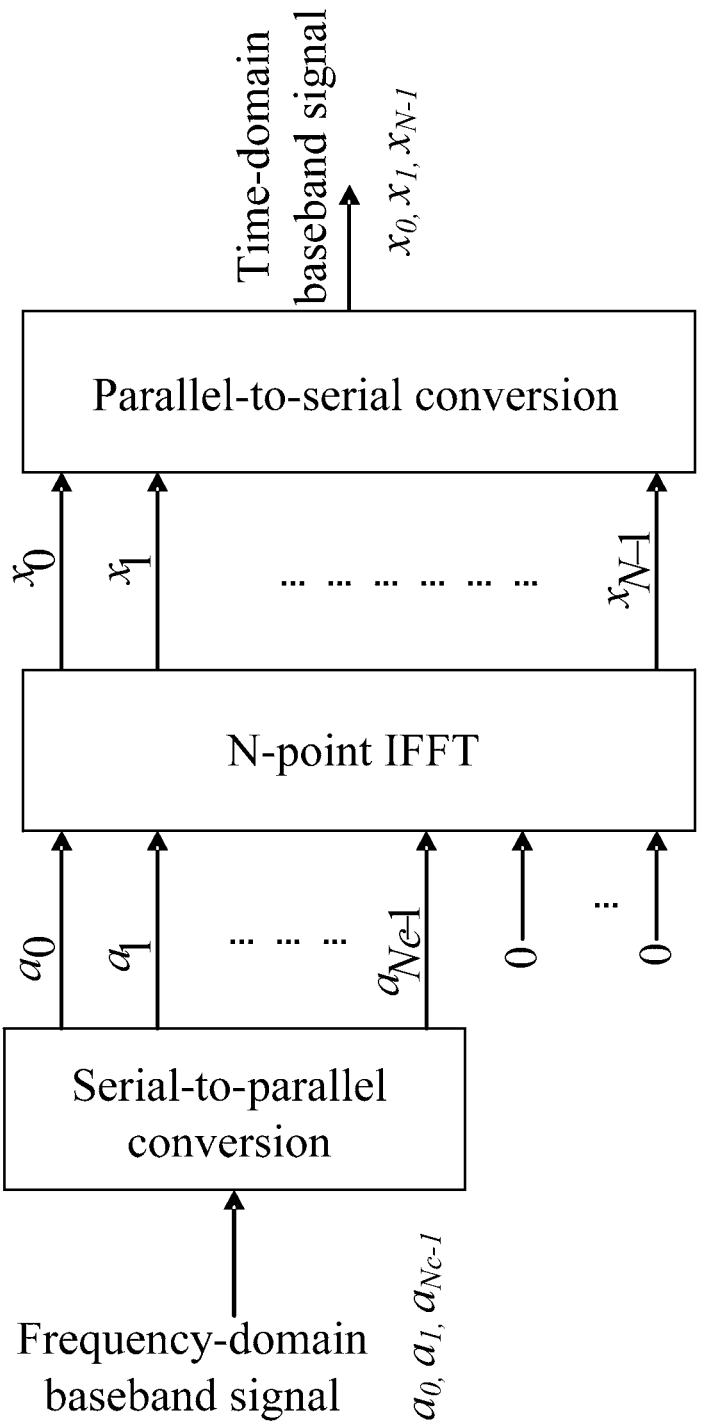
FIG. 7 is a schematic diagram of a process of generating an OFDM signal.

FIG. 7 shows a process of generating downlink OFDM signals. The frequency-domain baseband signals $a_0, a_1, \ldots, a_{Nc-1}$ undergo serial-to-parallel conversion, and are mapped onto $N_c$ subcarriers. The remaining subcarriers are filled with 0s, and then the IFFT is performed on N points to obtain time-domain baseband signals $x_0, x_1, \ldots, x_{N-1}$. Generally, N is far greater than $N_c$. Taking the LTE system as an example, for a bandwidth of 20 MHz, $N_c$=1200, N=2048, and the subcarrier interval is 15 KHz. Therefore, the rate of the time-domain baseband signal is 2048×15 KHz=30.72 Mbps, and the rate of the frequency-domain baseband signal is 1200×15

KHz=18 Mbps. In this embodiment, the resource mapping and the IFFT transformation are moved from the BBU to the RRU. Therefore, compared with the direct transmission of the time-domain baseband signal, the transmission in this embodiment requires much lower signal transmission bandwidth between the C-RAN node and the RRU. In addition, when the load of an air interface in a cell is not full, the $N_c$ subcarriers in each OFDM symbol may be partially idle (with filled 0s). Because the resource mapping and the IFFT transformation are moved from the BBU ahead to the RRU, the signals corresponding to the idle subcarriers are not transmitted, and only the signals of users on the occupied subcarriers are transmitted, which further decreases the signal transmission bandwidth required between the C-RAN node and the RRU.

In this way, compared with the prior art, because the IFFT transformation is moved from the BBU ahead to the RRU, the signal transmission bandwidth decreases by about 40% (ignoring the compression in the case that some of the $N_c$ subcarriers are idle), or, in other words, 1.67×compression. Because the MIMO precoding is moved from the BBU ahead to the RRU, a further 80% compression can be applied (ignoring impact caused by transmission of a tiny amount of information such as VRB resource information, and ignoring compression caused by no need of transmitting the signals on the corresponding subcarriers such as reference signal and synchronization channel), or, in other words, 5×compression. Therefore, the total compression rate is 100%−60%×20%≈88%, namely, 8.4×compression.

Embodiment 2

In embodiment 1 above, Coordinated Multi-Point (CoMP) processing based on network multi-input multi-output (Network-MIMO) of multiple cells on the physical layer is not taken into consideration. In such case, the forwarding unit needs to forward the downlink coded and modulated user signals of multiple cells to the corresponding RRU, and therefore, the corresponding RRU performs joint MIMO precoding on the downlink coded and modulated user signals of the multiple cells, maps the jointly MIMO-precoded signals, downlink control channel signal, reference signal, synchronization signal, and broadcast channel signal onto their respective subcarriers, performs IFFT transformation to obtain a downlink baseband signal, and sends the signal out. In this case, the transmission resource indication information further indicates the subcarriers that correspond to the joint MIMO-precoded signal and the downlink control channel signal respectively, so that the RRU maps the jointly MIMO-precoded signal and the downlink control channel signal onto their respective subcarriers according to the transmission resource indication information.

Figure 8:
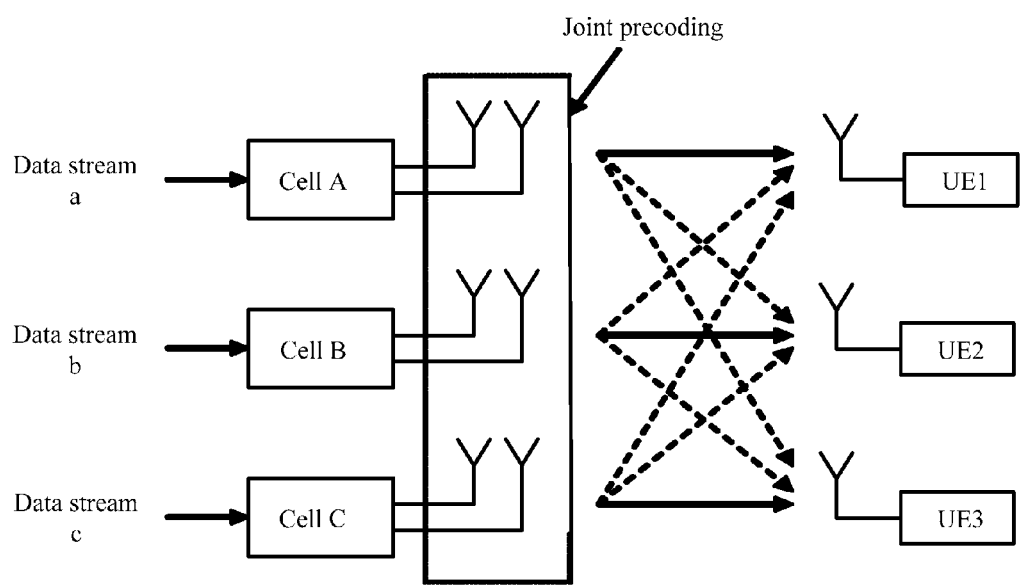
FIG. 8 is a schematic diagram of a scenario of CoMP processing based on Network-MIMO in multiple cells.

FIG. 8 is a schematic diagram of a scenario of CoMP processing based on Network-MIMO in multiple cells. As shown in FIG. 8, UE1, UE2, and UE3 belong to cells A, B, and C respectively. The 3 cells are responsible for transmitting data streams a, b, and c to the 3 UEs respectively. However, mutual interference exists between the downlink signals of the 3 UEs. The mutual interference generally occurs at the edge of a neighboring area between the 3 cells that are geographically adjacent to each other. To eliminate the interference between them (the dashed line in FIG. 8 represents interference signals from other cells), the CoMP processing technology based on the Network-MIMO may be applied. The transmitting antennas of the 3 cells are considered as jointly transmitting antennas. In this way, each cell of the system has two transmitting antennas, and 6 antennas are available in total. The data streams a, b, and c that belong to different cells are shared by the 3 cells, and therefore, the joint precoding of the 3 cells can be implemented. The foregoing operation may be expressed by the following mathematic formulas:

$$x = Ws = \begin{bmatrix} W_1 s \\ W_2 s \\ \vdots \\ W_q s \end{bmatrix},$$

namely, $$\begin{cases} x_1 = W_1 s \\ x_2 = W_2 s \\ \quad \vdots \\ x_q = W_q s \end{cases},$$

where, $$W = \begin{bmatrix} W_1 \\ W_2 \\ \vdots \\ W_q \end{bmatrix} \text{ and } x = \begin{bmatrix} x_1 \\ x_2 \\ \vdots \\ x_q \end{bmatrix}, s = \begin{bmatrix} s_1 \\ s_2 \\ \vdots \\ s_q \end{bmatrix}.$$

In the formulas above, q is the number of cells precoded jointly, $s_1, s_2, \ldots, s_q$ are data stream vectors of cells 1, 2, ..., q respectively, and correspond to $K_1, K_2, \ldots, K_q$ data streams respectively (namely, downlink coded and modulated user signals). Therefore, the total number of data streams is $K_1+K_2+\ldots+K_q=K$, and the number of transmitting antennas of the cells 1, 2, ..., q is $M_1, M_2, \ldots, M_q$ respectively; and the total equivalent number of transmitting antennas of the system is $M_1+M_2+\ldots+M_q=M$, where W is an M×K MIMO joint precoding matrix, which is composed of q MIMO precoding submatrixes $W_1, W_2, \ldots, W_q$. Such submatrixes are the local precoding matrix of each cell respectively. In other words, for the q cells precoded jointly, the local precoding operation of cell k may be expressed as:

$$x_k = W_k s \qquad (2)$$

In the formula above, $x_k$ is $M_k \times 1$ local precoding output, and $W_k$ is an $M_k \times K$ local precoding matrix. Evidently, in comparison with the general MIMO precoding shown in formula (1), in the joint precoding of multiple cells shown in formula (2), each cell needs to perform joint MIMO precoding by using the downlink coded and modulated user signals of all cells rather than the downlink coded and modulated user signal of only this cell.

In this embodiment, when multiple cells employ CoMP processing based on Network-MIMO on the physical layer, because the subcarriers of a data stream of a cell user in a VRB always have the same mode of coding and modulation and the same transmitting power, the streams transmitted between the C-RAN node and the RRU are K data streams $s_1, s_2, \ldots, s_q$ of users rather than the MIMO-precoded signal stream $x_k$, where the K data streams are not MIMO-precoded and need to be jointly precoded for multiple cells. Therefore, with the user data being shared between multiple cells, the downlink coded and modulated user signals are precoded jointly, and the joint MIMO precoding is also moved from the BBU ahead to the RRU.

In a practical system, considering factors such as system complexity, the number (q) of cells precoded jointly is generally 2 or 3. The signal to noise ratio (Signal to Noise Ratio, SNR) of users at the edge of a cell is generally not high, and higher-order modulation such as 16QAM or even 64QAM is seldom applied. Therefore, even if the data streams of users of all cells precoded jointly are sent to the RRU simultaneously, the good bandwidth compression effect may be still achieved because the subcarriers of a data stream of a user in a VRB always have the same mode of coding and modulation and the same transmitting power.

Taking the FDD-based LTE-A as an example, CoMP processing is performed on 3 neighboring cells. That is, a Network-MIMO technology based on that multiple cells share user data is applied to users at the edge of the cells (the users at the edge of the cells generally account for 10-20% of the total number of users). That is, the downlink coded and modulated user signals in the downlink direction are precoded jointly for multiple cells. It is assumed that each cell has 2 transmitting antennas, each user centralized by the CoMP (namely, user involved in the CoMP processing) has 1 data stream, the user data of two cells is modulated in a QPSK mode, and the user data of the remaining cell is modulated in a 16QAM mode. Therefore, after channel coding and modulation, for any one of the 3 cells, the corresponding CoMP user needs to transmit the In-phase or Quadrature-phase of data streams directed to the RRU; each subcarrier corresponds to 4 bits, the data modulated in a QPSK mode on this subcarrier needs to be expressed by 2 bits, and the data modulated in a 16QAM mode on this subcarrier needs to be expressed by 2 bits. Through the foregoing compression solution, because the 12 subcarriers have the same modulation mode, each of the 12 subcarriers carries only 4 bits of modulation information, uses 8×3=24 bits to carry the power offset of data of each cell, and uses 16 bits to carry the index of the local precoding matrix (due to joint precoding of multiple cells, the dimensions of the local precoding matrix become greater, and therefore, a greater codebook is applied). Therefore, each VRB needs to carry only 4×12+24+16=88 bits. By comparison, if the streams are transmitted to the RRU after undergoing the MIMO precoding, because each cell has 2 transmitting antennas and each sample point (corresponding to a subcarrier) needs to be carried through 16 bits, the 12 subcarriers require 16×12×2=384 bits. Therefore, in this practical example in a typical scenario, the bandwidth compression rate is up to about 78%. In a practical system, the percentage of the users at the cell edge to the total number of users is not high. Therefore, if the Network-MIMO technology that lets multiple cells share user data is applied, namely, in the case that joint precoding is performed on multiple cells in the downlink direction, the transmission bandwidth compression rate is still ideal between the C-RAN node and the RRU.

It should be noted that although this embodiment takes a C-RAN system as an example, no strict difference exists between the C-RAN system and other systems such as a DAS system characterized by centralized processing of signals and extending of the antenna/radio frequency through broadband transmission lines such as fibers. Especially, such systems have the same or similar structure with respect to baseband signal transmission and the internal structure of the base station, and therefore, various implementation solutions put forward herein are applicable to all other systems characterized by centralized processing of signals and extending of the antenna/radio frequency through broadband transmission lines such as fibers.

Figure 9:
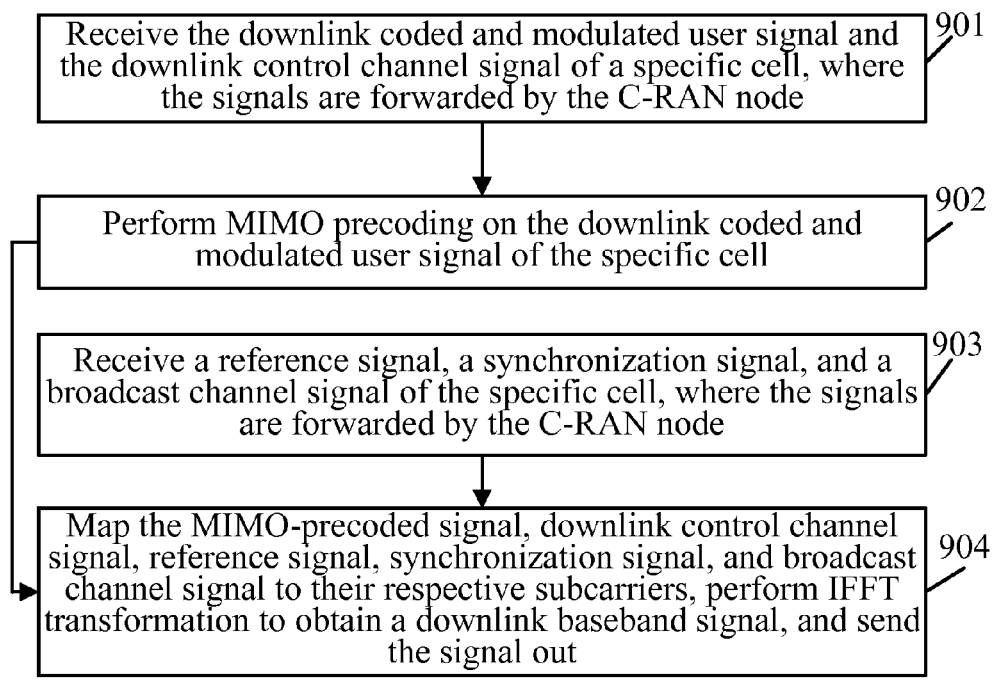
FIG. 9 is a flowchart of another downlink baseband signal generating method according to an embodiment of the present invention.

As shown in FIG. 9, FIG. 9 is a schematic flowchart of another downlink baseband signal generating method according to an embodiment of the present invention. The downlink baseband signal generating method is applicable to a system based on orthogonal frequency division multiple access or the same type of technology such as single carrier frequency division multiple access, for example, an LTE system, an LTE-A system, or a WiMAX system to reduce the signal transmission bandwidth between the C-RAN node and the RRU. As shown in FIG. 9, the method may include the following steps:

901. Receive a downlink coded and modulated user signal and a downlink control channel signal of a specific cell, where the signals are forwarded by a C-RAN node, the downlink coded and modulated user signal is obtained after the C-RAN node performs channel coding and modulation on a downlink data stream of the user in the specific cell, and the downlink control channel signal is generated by the C-RAN node according to physical-layer control information. The downlink control channel signal carries transmission resource indication information, and the transmission resource indication information indicates the subcarriers that correspond to the MIMO-precoded signal and the downlink control channel signal respectively.

In this embodiment, the forwarding unit in the C-RAN node can forward the downlink coded and modulated user signal and the downlink control channel signal of a specific cell to a corresponding RRU. For example, the forwarding unit may forward the downlink coded and modulated user signal and the downlink control channel signal of the specific cell to the corresponding RRU according to a preset forwarding configuration list, where the forwarding configuration list is used to record the mapping relationship between user information of the cell and corresponding RRU information. The user information may be a parameter indicating a user identity, such as IMEI; and the RRU information may be an RRU identifier.

902. Perform MIMO precoding on the downlink coded and modulated user signal of the specific cell.

903. Receive a reference signal, a synchronization signal, and a broadcast channel signal of the specific cell, where the signals are forwarded by the C-RAN node.

In this embodiment, the forwarding unit in the C-RAN node can forward the reference signal, synchronization signal, and broadcast channel signal of the specific cell to the corresponding RRU. For example, the forwarding unit may forward the reference signal, the synchronization signal and the broadcast channel signal of the specific cell to the corresponding RRU according to a preset forwarding configuration list, where the forwarding configuration list is used to record the mapping relationship between the user information of the specific cell and the corresponding RRU information.

904. Map the MIMO-precoded signal, downlink control channel signal, reference signal, synchronization signal, and broadcast channel signal of the specific cell to their respective subcarriers, perform IFFT transformation to obtain a downlink baseband signal, and send the signal out.

In this embodiment, according to the transmission resource indication information carried in the downlink control channel signal sent by the C-RAN node, the RRU can map the MIMO-precoded signal and the downlink control channel signal onto their respective subcarriers. The transmission resource indication information is used to indicate the subcarriers that correspond to the MIMO-precoded signal and the downlink control channel signal respectively.

According to the preset mapping rule, the RRU maps the reference signal, synchronization signal, and broadcast channel signal to their respective subcarriers, where the mapping rule is used to indicate the subcarriers that correspond to the reference signal, synchronization signal, and broadcast channel signal respectively.

In this embodiment, the order of step 901 to step 903 is not restricted.

In this embodiment, if the specific cell in step 901 and other cells employ CoMP processing based on Network-MIMO on the physical layer, alternatively, the RRU may receive the downlink coded and modulated user signals of other cells, where the signals are forwarded by the radio access network node. In this case, the transmission resource indication information further indicates the subcarriers that correspond to the joint MIMO-precoded signal and the downlink control channel signal respectively, so that the RRU maps the jointly MIMO-precoded signal and the downlink control channel signal onto their respective subcarriers according to the transmission resource indication information.

Accordingly, the RRU may perform joint MIMO precoding on the downlink coded and modulated user signal of the specific cell and the downlink coded and modulated user signals of other cells, map the jointly MIMO-precoded signals, downlink control channel signal, reference signal, synchronization signal, and broadcast channel signal onto their respective subcarriers, perform inverse fast Fourier transformation to obtain a downlink baseband signal, and send the signal out.

Likewise, according to the transmission resource indication information carried in the downlink control channel signal of the specific cell, the RRU may map the jointly MIMO-precoded signal and the downlink control channel signal of the specific cell to their respective subcarriers, which is not restricted herein.

In this embodiment, the forwarding unit included in the radio access network node corresponds to multiple BBUs. That is, the forwarding unit corresponds to multiple cells. When multiple cells employ CoMP processing based on Network-MIMO on the physical layer, a forwarding list applicable to CoMP processing based on Network-MIMO for multiple cells may be preset on the forwarding unit. The forwarding list is used to record the relationship between the multiple cells that employ CoMP processing based on Network-MIMO on the physical layer and the corresponding RRU, as shown in Table 1.

TABLE 1

| BBU1 | RRU1 |
|------|------|
| BBU2 |      |

Table 1 indicates that BBU1 and BBU2 employ CoMP processing based on Network-MIMO on the physical layer, where BBU1 and BBU2 correspond to RRU1. After receiving the downlink coded and modulated user signal output by BBU1, the downlink control channel signal, a reference signal, a synchronization signal, and a broadcast channel signal, the forwarding unit included in the radio access network node forwards the downlink coded and modulated user signal, downlink control channel signal, reference signal, synchronization signal, and broadcast channel signal to RRU1 according to Table 1. After receiving the downlink coded and modulated user signal output by BBU2, a downlink control channel signal, a reference signal, a synchronization signal, and a broadcast channel signal, the forwarding unit included in the radio access network node may forward the downlink coded and modulated user signal to RRU1 according to Table 1. RRU1 may perform joint MIMO precoding on the downlink coded and modulated user signal of BBU1 and the downlink coded and modulated user signal of BBU2, map the jointly MIMO-precoded signals, downlink control channel signal, reference signal, synchronization signal, and broadcast channel signal of BBU1 onto their respective subcarriers, perform inverse fast Fourier transformation to obtain a downlink baseband signal, and send the signal out.

In Table 1, BBU2 may be regarded as an interference source of RRU1, and BBU1 corresponds to RRU1. BBU1 does not impose interference onto RRU1. Therefore, after the joint MIMO precoding, it is necessary to map the jointly MIMO-precoded signals, and the downlink control channel signal, reference signal, synchronization signal, and broadcast channel signal of BBU1 onto their respective subcarriers, perform inverse fast Fourier transformation to obtain a downlink baseband signal, and send the signal out.

In this embodiment, the RRU receives a downlink coded and modulated user signal forwarded by the C-RAN node; performs MIMO precoding on the signal; maps a reference signal, a synchronization signal, and a broadcast channel signal that are forwarded by the C-RAN node, and the MIMO-precoded signal and the downlink control channel signal onto their respective subcarriers; performs IFFT transformation to obtain a downlink baseband signal, and sends the signal out. In this embodiment, the signals on the corresponding subcarriers do not need to be transmitted between the C-RAN node and the RRU, which reduces the signal transmission bandwidth between the C-RAN node and the RRU.

Figure 10:
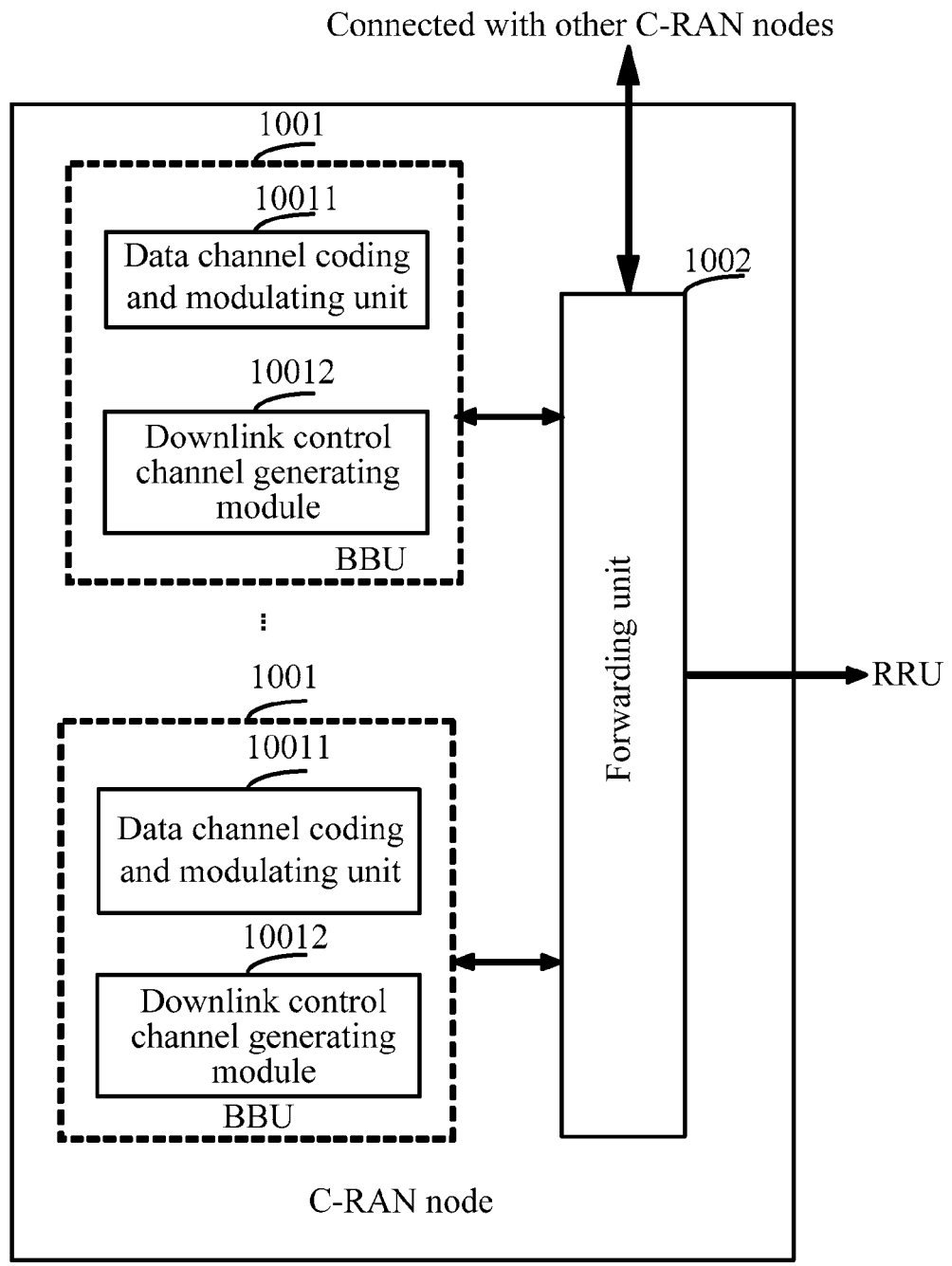
FIG. 10 is a schematic structural diagram of a C-RAN node according to an embodiment of the present invention.

Accordingly, an embodiment of the present invention provides a C-RAN node, which works together with the RRU to implement the uplink baseband channel generating method described above. The C-RAN node is applicable to a system based on orthogonal frequency division multiple access or the same type of technology such as single carrier frequency division multiple access, for example, an LTE system, an LTE-A system, or a WiMAX system to reduce the signal transmission bandwidth between the C-RAN node and the RRU. FIG. 10 is a schematic structural diagram of a C-RAN node according to an embodiment of the present invention. As shown in FIG. 10, the C-RAN node may include:

at least one BBU 1001 and a forwarding unit 1002.

The BBU 1001 may include:

a data channel coding and modulating module 10011, configured to perform channel coding and modulation on a downlink data stream of a user in a cell, obtain a downlink coded and modulated user signal of the cell, and output the signal to the forwarding unit 1002; and a downlink control channel generating module 10012, configured to generate a downlink control channel signal according to physical-layer control information, and output the signal to the forwarding unit 1002.

The forwarding unit 1002 is configured to forward the reference signal, synchronization signal and broadcast channel signal of the cell, and the downlink coded and modulated user signal and the downlink control channel signal to the corresponding RRU, so that the RRU performs MIMO precoding on the downlink coded and modulated user signal, maps the reference signal, synchronization signal, broadcast channel signal, the signal that has undergone the MIMO precoding, and the downlink control channel signal to their respective subcarriers, performs IFFT transformation to obtain a downlink baseband signal, and sends the signal out.

In an embodiment, the forwarding unit is specifically configured to forward the reference signal, synchronization signal and broadcast channel signal of the cell, and the downlink coded and modulated user signal and the downlink control channel signal to the corresponding RRU according to a preset forwarding configuration list, where the forwarding configuration list is used to record the mapping relationship between the user information and the corresponding RRU information.

In an alternative embodiment, when the specific cell and other cells employ CoMP processing based on Network-MIMO on the physical layer, the forwarding unit 1002 is further configured to forward the downlink coded and modulated user signals of other cells to the corresponding RRU, and therefore, the corresponding RRU performs joint MIMO precoding on the downlink coded and modulated user signal of the specific cell and the downlink coded and modulated user signals of other cells, maps the jointly MIMO-precoded signals and the downlink control channel signal, reference signal, synchronization signal, and broadcast channel signal of the specific cell onto their respective subcarriers, performs IFFT transformation to obtain a downlink baseband signal, and sends the signal out.

In this embodiment, after receiving the downlink data stream sent by a user in a cell, the data channel coding and modulating module 10011 performs channel coding and modulation on the downlink data stream of the user in the cell to obtain a downlink coded and modulated user signal of the cell; the forwarding unit forwards the reference signal, synchronization signal, and broadcast channel signal of the cell, and the downlink coded and modulated user signal and the downlink control channel signal to the corresponding RRU; and the corresponding RRU performs MIMO precoding on the downlink coded and modulated user signal, maps the reference signal, synchronization signal, and broadcast channel signal, the MIMO-precoded signal, and the downlink control channel signal to their respective subcarriers, performs IFFT transformation to obtain a downlink baseband signal, and sends the signal out. In this embodiment, the MIMO precoding, signal mapping and IFFT transformation are moved ahead to the RRU, and therefore, the signals on the corresponding subcarriers do not need to be transmitted between the C-RAN node and the RRU, which reduces the signal transmission bandwidth between the C-RAN node and the RRU.

Figure 11:
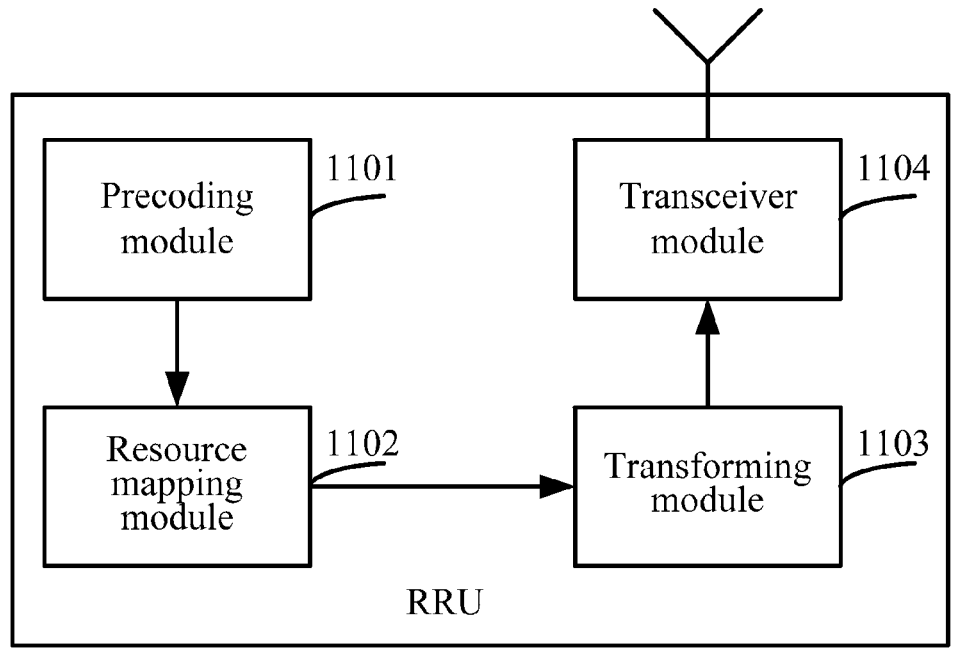
FIG. 11 is a schematic structural diagram of an RRU according to an embodiment of the present invention.

Accordingly, an embodiment of the present invention provides an RRU, which works together with a C-RAN node to implement the uplink baseband channel generating method described above. FIG. 11 is a schematic structural diagram of an RRU according to an embodiment of the present invention. As shown in FIG. 11, the RRU may include a precoding module, a resource mapping module, a transforming module, and a transceiver module.

The precoding module 1101 is configured to receive a downlink coded and modulated user signal and a downlink control channel signal of a specific cell, where the signals are forwarded by the C-RAN node; and perform MIMO precoding on the downlink coded and modulated user signal.

The downlink coded and modulated user signal of the specific cell is obtained after the C-RAN node receives a downlink data stream sent by a user in a cell and performs channel coding and modulation on the downlink data stream, and the downlink control channel signal is generated by the C-RAN node according to physical-layer control information.

The resource mapping module 1102 is configured to receive a reference signal, a synchronization signal, and a broadcast channel signal of a specific cell, where the signals are forwarded by the C-RAN node; and map the reference signal, the synchronization signal, the broadcast channel signal, the signal that has undergone the MIMO precoding performed by the precoding module 1101, and the downlink control channel signal onto their respective sub carriers.

The transforming module 1103 is configured to perform IFFT transformation on the signals mapped onto the subcarriers to obtain a downlink baseband signal.

The transceiver module 1104 is configured to send the downlink baseband signal out.

In an embodiment, the resource mapping module 1102 is specifically configured to receive a reference signal, a synchronization signal, and a broadcast channel signal of the cell, where the signals are forwarded by the C-RAN node; and map the reference signal, the synchronization signal, and the broadcast channel signal of the specific cell onto their respective subcarriers according to a preset mapping rule, where the mapping rule is used to indicate the subcarriers that correspond to the reference signal, synchronization signal, and broadcast channel signal respectively; and, according to transmission resource indication information sent by the C-RAN node, map the downlink coded and modulated user signal that has undergone the MIMO precoding performed by the precoding module 1101 and the downlink control channel signal to their respective subcarriers, where the transmission resource indication information is carried in the downlink control channel signal and is used to indicate the subcarriers that correspond to the MIMO-precoded signal and the downlink control channel signal respectively.

In this embodiment, when the specific cell and other cells employ CoMP processing based on Network-MIMO on the physical layer, alternatively, the precoding module 1101 is configured to receive the downlink coded and modulated user signals of other cells, where the signals are forwarded by the radio access network node; and perform joint MIMO precoding on the downlink coded and modulated user signals of other cells and the downlink coded and modulated user signal of the specific cell.

Accordingly, the resource mapping module 1102 is further configured to map the jointly MIMO-precoded signals, and the downlink control channel signal, reference signal, synchronization signal, and broadcast channel signal of the specific cell to their respective sub carriers.

Alternatively, according to the transmission resource indication information carried in the downlink control channel signal of the specific cell, the resource mapping module 1102 may map the jointly MIMO-precoded signals and the downlink control channel signal of the specific cell to their respective subcarriers, which is not restricted herein.

Accordingly, the transforming module 1103 is configured to perform IFFT transformation on the signals mapped onto the subcarriers to obtain a downlink baseband signal.

Accordingly, the transceiver module 1104 is configured to send the downlink baseband signal out.

In this embodiment, the precoding module 1101 performs MIMO precoding on the downlink coded and modulated user signal of a specific cell, where the signal is forwarded by the C-RAN node; the resource mapping module 1102 maps the reference signal, synchronization signal, and broadcast channel signal of the specific cell, where the signals are forwarded by the C-RAN node, the MIMO-precoded signal, and the downlink control channel signal of the specific cell onto their respective subcarriers; the transforming module 1103 performs IFFT transformation to obtain a downlink baseband signal; and the transceiver module 1104 sends the downlink baseband signal out. In this embodiment, the MIMO precoding, signal mapping and IFFT transformation are moved ahead to the RRU, and therefore, the signals on the corresponding subcarriers do not need to be transmitted between the C-RAN node and the RRU, which reduces the signal transmission bandwidth between the C-RAN node and the RRU.

Figure 12:
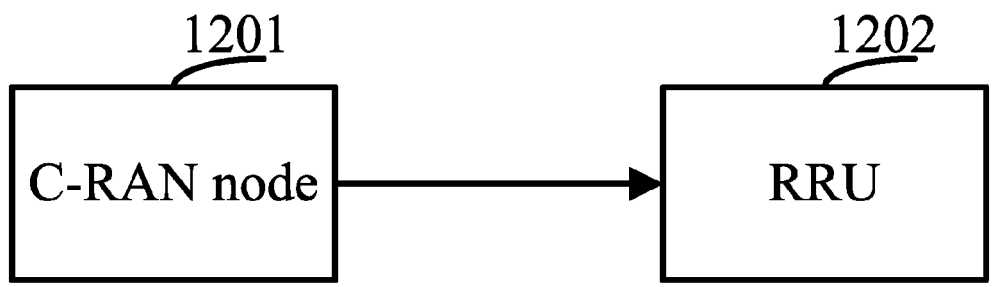
FIG. 12 is a schematic structural diagram of a downlink baseband signal generating system according to an embodiment of the present invention.

Accordingly, an embodiment of the present invention provides a downlink baseband signal generating system to implement the uplink baseband channel generating method described above. FIG. 12 is a schematic structural diagram of a downlink baseband signal generating system according to an embodiment of the present invention. As shown in FIG. 12, the system may include:

a C-RAN node 1201 and an RRU 1202.

The C-RAN node 1201 is configured to perform channel coding and modulation on a downlink data stream of a user in a specific cell to obtain a downlink coded and modulated user signal of the specific cell, generate a downlink control channel signal of the cell according to physical-layer control information, and forward a reference signal, a synchronization signal and a broadcast channel signal of the specific cell, and the downlink coded and modulated user signal and the downlink control channel signal to the RRU 1202.

The RRU 1202 is configured to receive a downlink coded and modulated user signal and a downlink control channel signal of the specific cell, where the signals are forwarded by the C-RAN node 1201; perform MIMO precoding on the downlink coded and modulated user signal of the specific cell; receive the reference signal, synchronization signal, and broadcast channel signal of the specific cell, where the signals are forwarded by the C-RAN node 1201; map the reference signal, synchronization signal and broadcast channel signal of the specific cell, and the MIMO-precoded signal and the downlink control channel signal of the specific cell to their respective subcarriers; perform IFFT transformation to obtain a downlink baseband signal, and send the downlink baseband signal out.

In this embodiment, when the specific cell and other cells employ CoMP processing based on Network-MIMO on the physical layer, alternatively, the RRU 1202 is further configured to receive the downlink coded and modulated user signals of other cells, where the signals are forwarded by the C-RAN node 1201; perform joint MIMO precoding on the downlink coded and modulated user signals of other cells and the downlink coded and modulated user signal of the specific cell; map the jointly MIMO-precoded signals, and the downlink control channel signal, reference signal, synchronization signal and broadcast channel signal of the specific cell onto their respective subcarriers; perform IFFT transformation to obtain a downlink baseband signal, and send the signal out.

Figure 13:
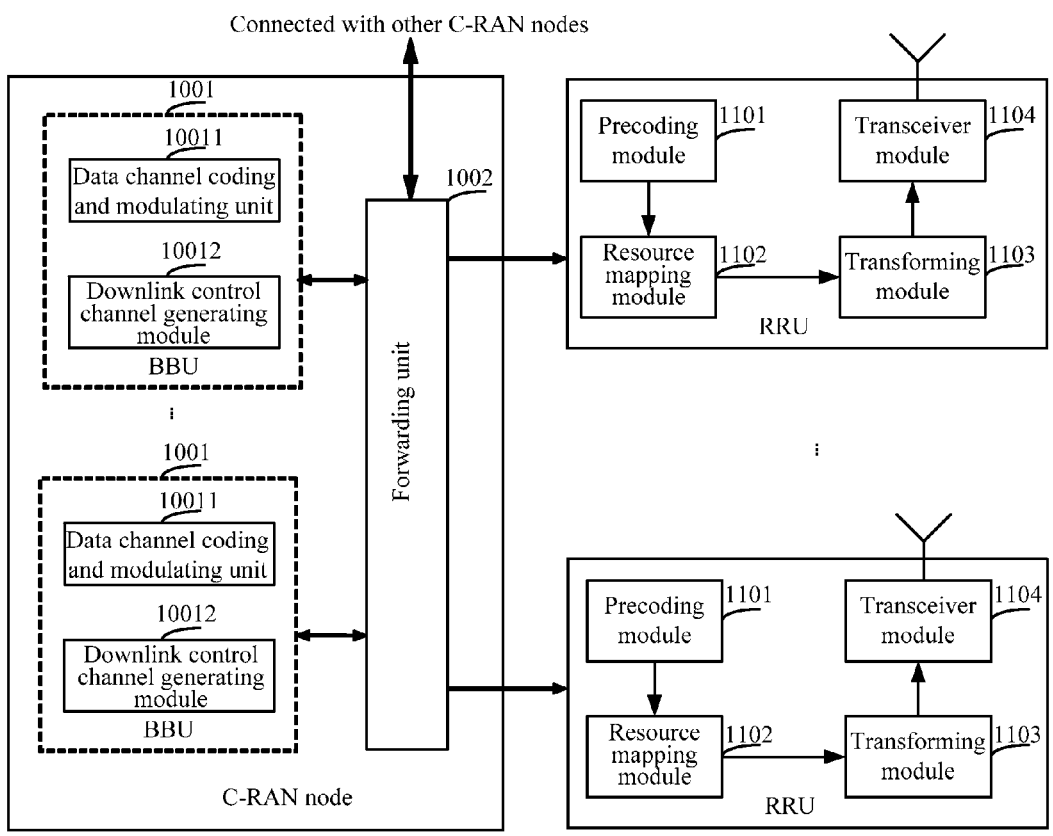
FIG. 13 is a schematic structural diagram of another downlink baseband signal generating system according to an embodiment of the present invention.

In the downlink baseband signal generating system provided in this embodiment, the C-RAN node 1201 may be connected with more than one RRU 1202 through a fiber or optical transport network. The structure of the C-RAN node 1201 may be the same as the structure shown in FIG. 10, and the structure of each RRU 1202 may be the same as the structure shown in FIG. 11. Therefore, the downlink baseband signal generating system provided in this embodiment may also be shown in FIG. 13. The functions of the functional modules in FIG. 13 have been detailed in the preceding embodiment, and are not repeated here any further.

In this embodiment, after receiving the downlink data stream sent by a user, the C-RAN node 1201 performs channel coding and modulation on the downlink data stream of the user to obtain a downlink coded and modulated user signal, and forwards the reference signal, synchronization signal, broadcast channel signal, downlink coded and modulated user signal, and the downlink control channel signal to the corresponding RRU 1202; afterward, the RRU 1202 performs MIMO precoding on the downlink coded and modulated user signal, maps the reference signal, synchronization signal, broadcast channel signal, the signal that has undergone the MIMO precoding, and the downlink control channel signal to their respective subcarriers, performs IFFT transformation to obtain a downlink baseband signal, and sends the signal out. In this embodiment, the MIMO precoding, signal mapping and IFFT transformation are moved ahead to the RRU 1202, and therefore, the signals on the corresponding subcarriers do not need to be transmitted between the C-RAN node 1201 and the RRU 1202, which reduces the signal transmission bandwidth between the C-RAN node and the RRU.

Persons of ordinary skill in the art should understand that all or a part of the steps of the method specified in any embodiment of the present invention may be implemented by a program instructing relevant hardware. The program may be stored in computer readable storage media. When the program runs, the program executes the steps of the method specified in any embodiment of the present invention. The storage media may be any media capable of storing program codes, such as a USB flash disk, read-only memory (Read-Only Memory, ROM), random access memory (Random Access Memory, RAM), magnetic disk, or CD-ROM.

The foregoing text has detailed a downlink baseband signal generating method, a relevant device and a relevant system. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A downlink baseband signal generating method, implemented by a radio access network node at a distributed base station with remote radio, comprising:

performing channel coding and modulation on a downlink data stream of a user in a cell, and obtaining a downlink coded and modulated user signal of the cell;

generating a downlink control channel signal according to physical-layer control information; and forwarding a reference signal, a synchronization signal, a broadcast channel signal, the downlink coded and modulated user signal, and the downlink control channel signal to a corresponding remote radio unit, so that the corresponding remote radio unit performs multi-input multi-output precoding on the downlink coded and modulated user signal, maps the downlink coded and modulated user signal that has undergone the multi-input multi-output precoding, the downlink control channel signal, the reference signal, the synchronization signal, and the broadcast channel signal to their respective subcarriers, performs inverse fast Fourier transformation to obtain a downlink baseband signal, and sends the downlink baseband signal out.

2. The downlink baseband signal generating method according to claim 1, wherein: the forwarding the reference signal, the synchronization signal, the broadcast channel signal, the downlink coded and modulated user signal, and the downlink control channel signal to the corresponding remote radio unit comprises:

forwarding the reference signal, the synchronization signal, the broadcast channel signal, the downlink coded and modulated user signal, and the downlink control channel signal to the corresponding remote radio unit according to a preset forwarding configuration list, wherein the preset forwarding configuration list is used to record a mapping relationship between user information and a remote radio unit identifier.

3. The downlink baseband signal generating method according to claim 1, wherein:

the downlink control channel signal carries transmission resource indication information, and the transmission resource indication information indicates subcarriers that correspond to the downlink coded and modulated user signal that has undergone the multi-input multi-output precoding and the downlink control channel signal respectively, so that the remote radio unit maps the downlink coded and modulated user signal that has undergone the multi-input multi-output precoding and the downlink control channel signal onto their respective subcarriers according to the transmission resource indication information.

4. The downlink baseband signal generating method according to claim 1, wherein: if the cell and one or more other cells employ coordinated multi-point processing based on Network-MIMO on a physical layer, the method further comprises:

forwarding downlink coded and modulated user signals of the one or more other cells to the corresponding remote radio unit, so that the corresponding remote radio unit performs joint multi-input multi-output precoding on the downlink coded and modulated user signal of the cell and the downlink coded and modulated user signals of the one or more other cells, maps the downlink coded and modulated user signal of the cell and the downlink coded and modulated user signals of the one or more other cells that have undergone the joint multi-input multi-output precoding, the downlink control channel signal, the reference signal, the synchronization signal, and the broadcast channel signal onto their respective subcarriers, performs the inverse fast Fourier transformation to obtain a downlink baseband signal, and sends the downlink baseband signal out, wherein the transmission resource indication information further indicates subcarriers that correspond to the downlink coded and modulated user signal of the cell and the downlink coded and modulated user signals of the one or more other cells that have undergone the joint multi-input multi-output precoding and the downlink control channel signal respectively, so that the remote radio unit maps the downlink coded and modulated user signal of the cell and the downlink coded and modulated user signals of the one or more other cells that have undergone the joint multi-input multi-output precoding and the downlink control channel signal onto their respective subcarriers according to the transmission resource indication information.

5. A downlink baseband signal generating method, implemented by a remote radio unit at a distributed base station with remote radio, comprising:

receiving a downlink coded and modulated user signal and a downlink control channel signal of a specific cell, wherein the downlink coded and modulated user signal and the downlink control channel signal are forwarded by a radio access network node, the downlink coded and modulated user signal is obtained after the radio access network node performs channel coding and modulation on a downlink data stream of a user in the specific cell, and the downlink control channel signal is generated by the radio access network node according to physical-layer control information;

performing multi-input multi-output precoding on the downlink coded and modulated user signal;

receiving a reference signal, a synchronization signal, and a broadcast channel signal that are forwarded by the radio access network node; and mapping the downlink coded and modulated user signal that has undergone the multi-input multi-output precoding, the downlink control channel signal, the reference signal, the synchronization signal, and the broadcast channel signal to their respective subcarriers, performing inverse fast Fourier transformation to obtain a downlink baseband signal, and sending the downlink baseband signal out.

6. The downlink baseband signal generating method according to claim 5, wherein: the mapping the downlink coded and modulated user signal that has undergone the multi-input multi-output precoding, the downlink control channel signal, the reference signal, the synchronization signal, and the broadcast channel signal to their respective subcarriers comprises:

mapping the downlink coded and modulated user signal that has undergone the multi-input multi-output precoding and the downlink control channel signal onto their respective subcarriers according to transmission resource indication information sent by the radio access network node, wherein the transmission resource indication information indicates subcarriers that correspond to the downlink coded and modulated user signal that has undergone the multi-input multi-output precoding and the downlink control channel signal respectively, and the transmission resource indication information is carried in the downlink control channel signal; and mapping the reference signal, the synchronization signal, and the broadcast channel signal to their respective subcarriers according to a preset mapping rule, wherein the preset mapping rule is used to indicate subcarriers that correspond to the reference signal, the synchronization signal, and the broadcast channel signal respectively.

7. The downlink baseband signal generating method according to claim 5, further comprising:

receiving downlink coded and modulated user signals of other cells, wherein the downlink coded and modulated user signals of the other cells are forwarded by the radio access network node, and the specific cell and the other cells employ coordinated multi-point processing based on Network-MIMO on a physical layer; and performing joint multi-input multi-output precoding on the downlink coded and modulated user signal of the specific cell and the downlink coded and modulated user signals of the other cells, mapping the downlink coded and modulated user signal of the specific cell and the downlink coded and modulated user signals of the other cells that have undergone the joint multi-input multi-output precoding signals, the downlink control channel signal, reference signal, synchronization signal, and broadcast channel signal onto their respective subcarriers, performing inverse fast Fourier transformation to obtain a downlink baseband signal, and sending the downlink baseband signal out.

8. A radio access network node comprising a computer processor and a non-transitory computer readable storage medium, at a distributed base station with remote radio, wherein the non-transitory computer readable storage medium comprising computer program codes which when executed by the computer processor cause the computer processor to execute the steps of:

performing channel coding and modulation on a downlink data stream of a user in a cell, obtaining a downlink coded and modulated user signal of the cell;

generating a downlink control channel signal according to physical-layer control information; and forwarding a reference signal, a synchronization signal and a broadcast channel signal of the cell, and the downlink coded and modulated user signal and the downlink control channel signal to a corresponding remote radio unit, so that the corresponding remote radio unit performs multi-input multi-output precoding on the downlink coded and modulated user signal, maps the downlink coded and modulated user signal that has undergone the multi-input multi-output precoding, the downlink control channel signal, the reference signal, the synchronization signal, and the broadcast channel signal to their respective subcarriers, performs inverse fast Fourier transformation to obtain a downlink baseband signal, and sends the downlink baseband signal out.

9. The radio access network node according to claim 8, wherein the computer processor is specifically caused to execute the steps of:

forwarding the reference signal, the synchronization signal and the broadcast channel signal, and the downlink coded and modulated user signal and the downlink control channel signal to the corresponding remote radio unit according to a preset forwarding configuration list, wherein the preset forwarding configuration list is used to record a mapping relationship between user information and a remote radio unit identifier.

10. The radio access network node according to claim 8, wherein the computer processor is specifically caused to execute the steps of:

forwarding downlink coded and modulated user signals of other cells to the corresponding remote radio unit, so that the corresponding remote radio unit performs joint multi-input multi-output precoding on the downlink coded and modulated user signal of the cell and the downlink coded and modulated user signals of the other cells, maps the downlink coded and modulated user signal of the cell and the downlink coded and modulated user signals of the other cells that have undergone the joint multi-input multi-output precoding, the downlink control channel signal, the reference signal, the synchronization signal, and the broadcast channel signal onto their respective subcarriers, performs the inverse fast Fourier transformation to obtain a downlink baseband signal, and sends the downlink baseband signal out, wherein the cell and the other cells employ coordinated multi-point processing based on Network-MIMO on a physical layer.

11. A remote radio unit comprising a computer processor and a non-transitory computer readable storage medium, at a distributed base station with remote radio, wherein the non-transitory computer readable storage medium comprising computer program codes which when executed by the computer processor cause the computer processor to execute the steps of:

receiving a downlink coded and modulated user signal and a downlink control channel signal of a specific cell, wherein the downlink coded and modulated user signal and the downlink control channel signal are forwarded by a radio access network node; and performing multi-input multi-output precoding on the downlink coded and modulated user signal, wherein the downlink coded and modulated user signal is obtained after the radio access network node performs channel coding and modulation on a downlink data stream of a user in the specific cell, and the downlink control channel signal is generated by the radio access network node according to physical-layer control information;

receiving a reference signal, a synchronization signal, and a broadcast channel signal of a specific cell that are forwarded by the radio access network node; and mapping the downlink coded and modulated user signal that has undergone the multi-input multi-output precoding, the downlink control channel signal, the reference signal, the synchronization signal, and the broadcast channel signal to their respective subcarriers;

performing inverse fast Fourier transformation on the signals mapped onto the subcarriers to obtain a downlink baseband signal; and sending the downlink baseband signal out.

12. The remote radio unit according to claim 11, wherein the computer processor is specifically caused to execute the steps of:

receiving the reference signal, synchronization signal, and broadcast channel signal of the specific cell that are forwarded by the radio access network node; and mapping the reference signal, the synchronization signal, and the broadcast channel signal onto their respective subcarriers according to a preset mapping rule, wherein the preset mapping rule is used to indicate the subcarriers that correspond to the reference signal, the synchronization signal, and the broadcast channel signal respectively; and mapping the downlink coded and modulated user signal has undergone the multi-input multi-output precoding performed by the precoding module and the downlink control channel signal to their respective subcarriers according to transmission resource indication information sent by the radio access network node, wherein the transmission resource indication information is carried in the downlink control channel signal and is used to indicate the subcarriers that correspond to the downlink coded and modulated user signal that has undergone the multi-input multi-output precoding and the downlink control channel signal respectively.

13. The remote radio unit according to claim 11, wherein the computer processor is specifically caused to execute the steps of:

receiving downlink coded and modulated user signals of other cells, wherein the downlink coded and modulated user signals of the other cells are forwarded by the radio access network node; and performing joint multi-input multi-output precoding on the downlink coded and modulated user signals of the other cells and the downlink coded and modulated user signal of the specific cell, wherein the specific cell and the other cells employ coordinated multi-point processing based on Network-MIMO on a physical layer; and mapping the downlink coded and modulated user signal of the specific cell and the downlink coded and modulated user signals of the other cells that have undergone the joint multi-input multi-output precoding, the downlink control channel signal, the reference signal, the synchronization signal, and the broadcast channel signal to their respective subcarriers.

* * * * *